US012576835B2

(12) United States Patent
Yang

(10) Patent No.: US 12,576,835 B2
(45) Date of Patent: Mar. 17, 2026

(54) METHOD AND APPARATUS FOR CONTROLLING PARKING OF VEHICLE USING LiDAR SENSOR

(71) Applicants: Hyundai Motor Company, Seoul (KR); Kia Corporation, Seoul (KR)

(72) Inventor: Dong Hun Yang, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 110 days.

(21) Appl. No.: 18/395,912

(22) Filed: Dec. 26, 2023

(65) Prior Publication Data

US 2024/0351579 A1 Oct. 24, 2024

(30) Foreign Application Priority Data

Apr. 24, 2023 (KR) ........................ 10-2023-0053114

(51) Int. Cl.
*B60W 30/09* (2012.01)
*B60W 30/06* (2006.01)
(Continued)

(52) U.S. Cl.
CPC ............ *B60W 30/09* (2013.01); *B60W 30/06* (2013.01); *G06V 10/762* (2022.01); *G06V 20/58* (2022.01);
(Continued)

(58) Field of Classification Search
CPC .. B60W 30/06; B60W 30/09; B60W 30/0956;

B60W 40/076; B60W 50/00; B60W 50/02; B60W 60/0025; B60W 2050/0019; B60W 2050/0075; B60W 2050/021; B60W 2420/408;
(Continued)

(56) References Cited

U.S. PATENT DOCUMENTS 9,805,592 B2 * 10/2017 Ibrahim ................ G01S 5/0072
11,562,550 B1 * 1/2023 Asghar ................... G06F 3/012
(Continued)

FOREIGN PATENT DOCUMENTS

CN 115461258 A * 12/2022 ............. G06V 20/64
CN 118597122 A * 9/2024 ............. G01B 21/20
(Continued)

*Primary Examiner* — Atul Trivedi
(74) *Attorney, Agent, or Firm* — Banner & Witcoff, Ltd.

(57) ABSTRACT

An apparatus for controlling a vehicle is introduced. The apparatus may comprise a processor, and memory storing instructions, when executed by the processor, may cause the apparatus to: receive information associated with a plurality of objects on a ground, generate cell-by-cell position information and slope information for each of the plurality of objects, generate, based on performing a clustering process on each piece of the cell-by-cell position information and slope information, clustering information, generate slope angle information and boundary information, determine whether one of the plurality of objects is behind a boundary, compare a bumper angle of the vehicle and an object angle of the one of the plurality of objects, determine whether the vehicle is likely to collide with the one of the plurality of objects, and delete a piece of the cell-by-cell position information and slope information associated with the one of the plurality of objects.

20 Claims, 13 Drawing Sheets

(51) Int. Cl.
*G06V 10/762* (2022.01)
*G06V 20/58* (2022.01)
(52) U.S. Cl.
CPC ..... *B60W 2552/15* (2020.02); *B60W 2554/20* (2020.02); *B60W 2710/18* (2013.01)
(58) Field of Classification Search
CPC ........ B60W 2552/15; B60W 2552/20; B60W 2554/20; B60W 2710/18; G06V 10/762; G06V 20/58; G06V 20/588
USPC .......................................................... 701/26
See application file for complete search history.

(56) References Cited

U.S. PATENT DOCUMENTS

| | | | | |
|---|---|---|---|---|
| 2016/0094079 A1* | 3/2016 | Hiroki | ....................... | H02J 7/34 320/108 |
| 2021/0373173 A1* | 12/2021 | Ozaslan | ................ | G01S 17/931 |
| 2022/0013006 A1* | 1/2022 | Srivastava | ........... | G08G 1/0141 |
| 2022/0066456 A1* | 3/2022 | Ebrahimi Afrouzi | ....................... | G06F 3/04883 |
| 2022/0152826 A1* | 5/2022 | Danielczuk | ............ | G06V 20/58 |
| 2022/0164245 A1* | 5/2022 | Lepird | ................ | G06F 11/0778 |
| 2022/0187841 A1* | 6/2022 | Ebrahimi Afrouzi | ....................... | G05D 1/0272 |
| 2022/0194424 A1* | 6/2022 | Li | ..................... | B60W 30/0956 |
| 2022/0212694 A1* | 7/2022 | Varnhagen | ........ | B60W 60/0018 |
| 2022/0314940 A1* | 10/2022 | Kim | ..................... | B60K 35/28 |
| 2022/0402527 A1* | 12/2022 | Li | ....................... | B60W 30/095 |
| 2023/0037767 A1* | 2/2023 | Yang | ..................... | G08G 1/167 |
| 2023/0103359 A1* | 4/2023 | Rivers | ................. | G01C 21/203 701/2 |
| 2023/0106673 A1* | 4/2023 | Asghar | ................ | A61B 5/4809 382/104 |
| 2023/0211800 A1* | 7/2023 | Nguyen | ................. | B60K 35/22 701/23 |
| 2024/0010196 A1* | 1/2024 | Leung | .............. | B60W 60/0015 |
| 2024/0310851 A1* | 9/2024 | Ebrahimi Afrouzi | ... | G01S 17/87 |
| 2024/0317254 A1* | 9/2024 | Tran | ..................... | G06V 20/588 |
| 2024/0319746 A1* | 9/2024 | Johnson | .................. | G01S 15/89 |
| 2025/0054318 A1* | 2/2025 | Sisbot | ....................... | B60R 1/27 |
| 2025/0091569 A1* | 3/2025 | Panthri | ................. | B60W 30/06 |
| 2025/0155244 A1* | 5/2025 | Hong | ................. | G01C 21/3819 |

FOREIGN PATENT DOCUMENTS

| | | | | |
|---|---|---|---|---|
| CN | 119142328 A | * | 12/2024 | ............ B60W 40/06 |
| CN | 119152728 A | * | 12/2024 | ............ B60W 40/12 |
| CN | 119283889 A | * | 1/2025 | .......... B60W 60/001 |
| CN | 119773891 A | * | 4/2025 | |
| EP | 3943354 A1 | * | 1/2022 | ........ B60W 30/0956 |
| EP | 4156043 A1 | * | 3/2023 | ........... G08G 1/0112 |
| WO | WO-2023036032 A1 | * | 3/2023 | ............... G06T 7/70 |
| WO | WO-2025084037 A1 | * | 4/2025 | ............... G06T 7/00 |

* cited by examiner

Recognition unit ~100

Clustering unit ~110

Boundary unit ~120

Post-processing unit ~130

Sensor fusion unit ~140

Autonomous parking control unit ~150

(a)

(b)

(a)

(b)

700

800

1000

METHOD AND APPARATUS FOR CONTROLLING PARKING OF VEHICLE USING LiDAR SENSOR

CROSS-REFERENCE TO RELATED APPLICATION

This application claims the benefit of priority to Korean Patent Application No. 10-2023-0053114, filed in the Korean Intellectual Property Office on Apr. 24, 2023, the entire contents of which are incorporated herein by reference.

TECHNICAL FIELD

The present disclosure relates to a method and an apparatus for controlling parking of a vehicle using a LiDAR sensor.

BACKGROUND

It should be noted that the following description merely provides background information related to the present example and does not constitute the prior art.

With autonomous driving technology, sensors for monitoring surroundings of a vehicle, such as radar, LiDAR (light detection and ranging), cameras, and ultrasonic sensors, may be used. Among these sensors, LiDAR uses laser pulses whose wavelength ranges from 0.25 to 1 μm which is shorter than the wavelength range of radar. Accordingly, LiDAR is able to detect smaller objects than radar. LiDAR may be advantageous when compared to radar since it is able to detect the presence or absence of an obstacle and even the distance to it and its shape.

However, information based on which a parking control apparatus using LiDAR identifies a slope may be incomplete depending on the presence or absence of an object on the slope and the height of the object. In a situation where there is an object on a slope and the height of the object is smaller than the height of a lowermost portion of a vehicle body, no breaking error is supposed to happen since there is no risk of collision. However, the incomplete information may cause the parking control apparatus to make an error in determining the likelihood of a collision, which may result in a braking error.

SUMMARY

According to the present disclosure, an apparatus may comprise a processor, and memory storing instructions, when executed by the processor, may cause the apparatus to: receive, from at least one sensor disposed on a vehicle, information associated with a plurality of objects on a ground, wherein the plurality of objects are located in different cells, generate, based on the information, cell-by-cell position information and slope information for each of the plurality of objects, wherein a piece of the cell-by-cell position information indicates coordinates of an object in a cell of the different cells, and a piece of the slope information indicates whether the object in the cell is placed on a slope, generate, based on performing a clustering process on each piece of the cell-by-cell position information and slope information, clustering information, generate, based on the clustering information, slope angle information and boundary information, wherein the boundary information indicates a boundary associated with the different cells, and the slope angle information indicates an angle between the boundary and a direction perpendicular to a traveling direction of the vehicle, determine, based on the slope angle information and the boundary information, whether one of the plurality of objects is behind the boundary, based on a determination that the one of the plurality of objects is behind the boundary, compare a bumper angle of the vehicle and an object angle of the one of the plurality of objects, wherein the bumper angle is an angle between a lowermost portion of a front portion of the vehicle and the ground, and the object angle is an angle between the one of the plurality of objects and the ground, determine, based on the comparison, whether the vehicle is likely to collide with the one of the plurality of objects, and based on a determination that the vehicle is not likely to collide with the one of the plurality of objects, delete a piece of the cell-by-cell position information and slope information associated with the one of the plurality of objects.

The apparatus, wherein the instructions, when executed by the processor, may cause the apparatus to: determine whether a cell, of the different cells, includes an object, based on a determination that the cell includes the object: generate x, y, and z coordinate information of the object in the cell, and generate the slope information based on whether the object is identified to be lying on a slope.

The apparatus, wherein the instructions, when executed by the processor, may cause the apparatus to: select position coordinates of an object in the leftmost cell, among all objects placed on the slope, as reference coordinates, determine that an object in a cell located on a right side of the leftmost cell where the reference coordinates are located on the slope, or that the object in the cell is not placed on the slope and position coordinates of the object in the cell are located within a threshold distance from the reference coordinates, based on the determination, perform the clustering process on the position coordinates of the object in the cell to generate clustered position coordinates, change the reference coordinates to the clustered position coordinates, and repeat, based on the change, the selection, the determination, and the clustering process.

The apparatus, wherein the instructions, when executed by the processor, may cause the apparatus to: select position coordinates of an object in the leftmost cell, among all objects placed on the slope, as reference coordinates, determine that an object in a cell located on a right side of the leftmost cell where the reference coordinates are not located on the slope and that position coordinates of the object in the cell are located outside a threshold distance from the reference coordinates, or that there is no object in the cell located to a right side of the leftmost cell where the reference coordinates are located, based on the determination, perform a process of generating temporary reference coordinates of the object in the cell and perform the clustering process on the temporary reference coordinates to generate clustered temporary reference coordinates, change the reference coordinates to the clustered temporary reference coordinates, and repeat, based on the change, the selection, the determination, the process of generating temporary reference coordinates, and the clustering process.

The apparatus, wherein the instructions, when executed by the processor, may cause the apparatus to: select a first point from a cell located on a left side of the traveling direction of the vehicle, the first point having the smallest x coordinate among all position coordinates in cells within a cluster zone, select a second point from the cells such that an angle, between a line perpendicular to the travelling direction of the vehicle and a line connecting the first point and the second point, is the smallest, generate an angle based on the first and second points, generate, for each of the cells, an x coordinate of a boundary point in a cell based on the first point, the angle, and y coordinate information for the cell, and generate the boundary by connecting the x coordinates generated for each of the cells.

The apparatus, wherein the instructions, when executed by the processor, may cause the apparatus to: compare an x coordinate of a boundary point in a cell and an x coordinate of an object in the cell, determine that the x coordinate of the boundary point is smaller than the x coordinate of the object, and based on the determination, determine that the object is behind the boundary.

The apparatus, wherein the instructions, when executed by the processor, may cause the apparatus to: compare a height of an object in front of the boundary and a height of the vehicle, wherein the height of the vehicle is a distance between a lowermost portion of the vehicle and the ground, determine that the height of the object is smaller than the height of the vehicle, and based on the determination, delete a piece of the cell-by-cell position information and the slope information associated the object.

The apparatus, wherein the instructions, when executed by the processor, may cause the apparatus to: generate coordinate and environment information, and control autonomous parking of the vehicle based on the coordinate and environment information. The apparatus, wherein the instructions, when executed by the processor, may cause the apparatus to perform at least one of collision detection, braking control, or user experience control.

According to the present disclosure, a method may comprise receiving, from at least one sensor disposed on a vehicle, information associated with a plurality of objects on the ground, wherein the plurality of objects are located in different cells, generating, based on the information, cell-by-cell position information and slope information for each of the plurality of objects, wherein a piece of the cell-by-cell position information indicates coordinates of an object in a cell of the different cells, and a piece of the slope information indicates whether the object in the cell is placed on a slope, generate, based on performing a clustering process on each piece of the cell-by-cell position information and the slope information, clustering information, generating, based on the clustering information, slope angle information and boundary information, wherein the boundary information indicates a boundary associated with the different cells, and the slope angle information indicates an angle between the boundary and a direction perpendicular to a traveling direction of the vehicle, and post-processing sensor recognition information based on the slope angle information and the boundary information, wherein the post-processing the sensor recognition information may comprise: determining whether one of the plurality of objects is behind the boundary based on the slope angle information and the boundary information, comparing a bumper angle of the vehicle and an object angle of the one of the plurality of objects, wherein the bumper angle is an angle between a lowermost portion of a front portion of the vehicle and the object angle is an angle between the one of the plurality of objects and the ground, determine, based on the comparing, whether the vehicle is likely to collide with the one of the plurality of objects, and deleting a piece of the cell-by-cell position information and slope information associated with the one of the plurality of objects.

The method, wherein the performing the clustering process may comprise: determining whether a cell, of the different cells, includes an object, based on a determination that the cell includes the object: generating x, y, and z coordinate information of the object in the cell, and generating the slope information based on whether the object is identified to be placed on a slope.

The method, wherein the generating the clustering information may comprise selecting position coordinates of an object in the leftmost cell, among all objects placed on the slope, as reference coordinates, determining that an object in a cell located on a right side of the leftmost cell where the reference coordinates are located on the slope, or that the object in the cell is not placed on the slope and position coordinates of the object in the cell are located within a threshold distance from the reference coordinates, based on the determining, performing the clustering process on the position coordinates of the object in the cell to generate clustered position coordinates, changing the reference coordinates to the clustered position coordinates, and repeating, based on the changing, the selecting, the determining, and the clustering process.

The method, wherein the generating the clustering information may comprise selecting position coordinates of an object in the leftmost cell, among all objects placed on the slope, as reference coordinates, determining that an object in a cell to the right of the leftmost cell where the reference coordinates are not located on the slope and that position coordinates of the object in the cell are located outside a threshold distance from the reference coordinates, or that there is no object in the cell located on a right side of the leftmost cell where the reference coordinates are located, based on the determining, performing a process of generating temporary reference coordinates of the object in the cell and performing the clustering process on the temporary reference coordinates to generate clustered temporary reference coordinates, changing the reference coordinates to the clustered temporary reference coordinates, and repeating, based on the changing, the selecting and the determining, the process of generating temporary reference coordinates, and the clustering process.

The method, wherein the generating the slope angle information and the boundary information may comprise selecting a first point from a cell located on a left side of the traveling direction of the vehicle, the first point having the smallest x coordinate among all position coordinates in cells within a cluster zone, selecting a second point from the cells such that an angle, between a line perpendicular to the travelling direction of the vehicle and a line connecting the first point and the second point, is the smallest, generating an angle based on the first and second points, generating, for each of the cells, an x coordinate of a boundary point in a cell based on the first point, the angle, and y coordinate information for the cell, and generating the boundary by connecting the x coordinates generated for each of the cells.

The method, wherein the post-processing process may comprise comparing an x coordinate of a boundary point in a cell and an x coordinate of an object in the cell, determining that the x coordinate of the boundary point is smaller than the x coordinate of the object, and based on the determining, determining that the object is behind the boundary.

The method, wherein the post-processing process may comprise comparing a height of an object in front of the boundary and a height of the vehicle, wherein the height of the vehicle is a distance between a lowermost portion of the vehicle and the ground, determining that the height of the object is smaller than the height of the vehicle, and based on the determination, deleting a piece of the cell-by-cell position information and the slope information associated the object.

The method, may further comprise generating coordinate and environment information based on information post-processed by the post-processing process, and controlling autonomous parking of the vehicle based on the coordinate and environment information. The method, wherein the controlling of autonomous parking may comprise performing at least one of collision detection, braking control, or user experience control.

DETAILED DESCRIPTION

Figure 1:
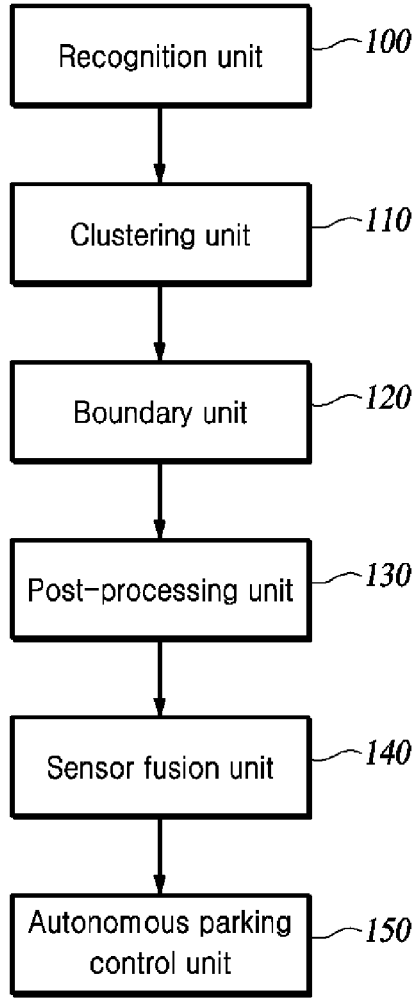
FIG. 1 shows an example of a configuration of a parking control apparatus according to an example of the present disclosure.

Hereinafter, some examples of the present disclosure will be described in detail with reference to the accompanying drawings. In the following description, like reference numerals preferably designate like elements, although the elements are shown in different drawings. Further, in the following description of some examples, a detailed description of related known components and functions when considered obscuring the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

The detailed description set forth below in conjunction with the appended drawings is intended to describe exemplary examples of the present disclosure and is not intended to represent the only examples in which the present disclosure may be practiced. FIG. 1 shows an example of a configuration of a parking control apparatus according to an example of the present disclosure.

Referring to FIG. 1, the parking control apparatus includes all or a part of a recognition unit 100, a clustering unit 110, a boundary unit 120, a post-processing unit 130, a sensor fusion unit 140, and an autonomous parking control unit 150.

In the recognition unit 100, at least one LiDAR sends out a laser toward an object ahead, receives the laser which is reflected back, recognizes information on the object based on the received laser, and generates position coordinates, etc. According to an example of the present disclosure, the recognition unit 100 generates identification information (hereinafter, "slope information") relating to whether there is an object on the slope, and generates, for each cell, information such as x-y-z coordinates (hereinafter, "position coordinate information") of a recognized object. Here, the cell may be one of the segments into which a certain zone ahead of the vehicle is divided by units of angle. For a cell where there is no object, position coordinate information and slope information are not generated. The recognition unit 100 passes the generated information to the clustering unit 110.

The clustering unit 110 clusters information on an object ahead received from the recognition unit 100. Here, the term "clustering" refers to a machine learning technique in which data with similar characteristics is clustered together. According to an example of the present disclosure, the clustering unit 110 may perform clustering by comparing cell-by-cell position coordinate information and slope information of an object ahead which is passed from the recognition unit 100 with position coordinate information and slope information of an object in a neighboring cell. The clustering unit 110 passes information on a clustered zone and information received from the recognition unit 100 to the boundary unit 120.

The boundary unit 120 establishes a virtual slope boundary by using position coordinate information for the zone clustered by the clustering unit 110. According to an example of the present disclosure, the boundary unit 120 may generate a virtual slope angle by using position coordinate information of objects within the zone clustered by the clustering unit 110, and generate a virtual slope boundary 320 by using this virtual slope angle and position coordinate information of a reference point. Here, the term "virtual slope boundary" refers to a boundary that is virtually generated to post-process information, and the term "virtual slope angle" refers to an angle between the virtual slope boundary and a direction perpendicular to the direction of travel of the vehicle. The boundary unit 120 passes the generated virtual slope boundary and the information received from the recognition unit 100 to the post-processing unit 130.

The post-processing unit 130 identifies whether the object is behind the virtual slope boundary, and determines the likelihood of collision between the object and the vehicle.

Here, the term "object behind the virtual slope boundary" refers to an object located farther away from the vehicle than the virtual slope boundary. If the result of the identification shows that there is a likelihood of collision, the position coordinate information and slope information of the object are deleted. According to an example of the present disclosure, the post-processing unit 130 may determine the likelihood of collision between the vehicle and an object ahead located behind a virtual slope boundary set by the boundary unit 120 by comparing the angle (hereinafter, "object angle") between the object and the ground and the angle (hereinafter, "bumper angle") between a lowermost portion of a front portion of the vehicle and the ground. If it is determined that there is no likelihood of collision, the post-processing unit 130 may delete the position coordinate information and slope information of this object. According to an example of the present disclosure, the post-processing unit 130 may determine the likelihood of collision between the vehicle and an object ahead in front of the virtual slope boundary by comparing the z-coordinate of the object (hereinafter, "the height of the object") and an inputted distance (hereinafter, "the height of the vehicle") between the lowermost portion of the vehicle and the ground. Here, the term "object in front of the virtual slope boundary" refers to an object located closer to the vehicle than the virtual slope boundary. If it is determined that there is no likelihood of collision, the post-processing unit 130 may delete the position coordinate information and slope information of this object. The post-processing unit 130 passes deleted and undeleted position coordinate information and slope information of objects to the sensor fusion unit 140.

The sensor fusion unit 140 may integrate the information received from the post-processing unit 130 with information post-processed by other sensors to generate coordinate information and environment information. According to an example of the present disclosure, the sensor fusion unit 140 may integrate post-processed camera recognition information and post-processed ultrasonic sensor recognition information with the information received from the post-processing unit to generate coordinate information and environment information of objects ahead of the vehicle. The sensor fusion unit 140 passes the generated coordinate information and environment information to the autonomous parking control unit 150.

The autonomous parking control unit 150 performs autonomous parking control of the vehicle by utilizing the coordinate and environment information received from the sensor fusion unit 140. The autonomous parking control unit 150 may utilize the coordinate and environment information generated by the sensor fusion unit 140 in collision detection, braking control, and UX control.

Figure 2:
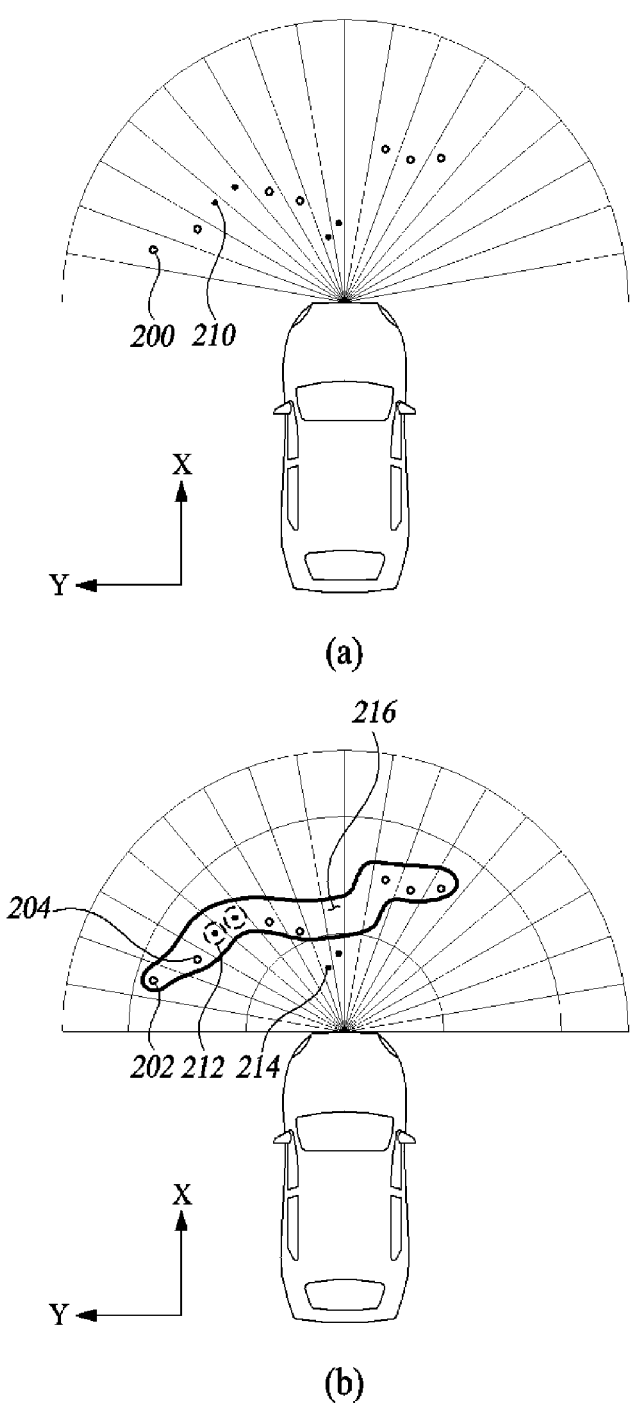
FIG. 2 shows an example of a process of clustering position coordinates in cells according to an example of the present disclosure.

FIG. 2 shows an example of a process of clustering position coordinates in cells according to an example of the present disclosure.

Referring to (a) of FIG. 2, the recognition unit 100 generates position coordinate information and slope information of an object on a cell-by-cell basis. Here, the term "slope information" may be identification information based on which the object is identified to be an object 200 lying on the slope or an object 210 located somewhere else other than the slope. For a cell where there is no object, position coordinate information and slope information are not generated. A process of generating position coordinate information and slope information is repeated for every cell.

Referring to (b) of FIG. 2, the clustering unit 110 selects cell-by-cell position coordinates 202 of an object in the leftmost cell, among all or parts of objects lying on the slope, as reference coordinates. The clustering unit 110 may use position coordinate information and slope information generated by the recognition unit 100 in a process of setting the reference coordinates. For an object 204 in a cell to the right of the reference coordinates that is lying on the slope, or for an object 212 that is not on the slope, but whose position coordinates are present within a set distance, for example, 0.5 m, from the reference coordinates, the position coordinates of the object in the right cell are clustered, and the clustered coordinates are set as the reference coordinates. For an object 214 in a cell to the right of the reference coordinates that is not on the slope, but whose position coordinates are present outside a set distance, for example, 0.5 m, from the reference coordinates, or if there is no object 216 in a cell to the right of the reference coordinates, temporary reference coordinates are generated for that right cell. Afterwards, the clustering process using the changed reference coordinate is repeated up to the rightmost cell.

Figure 3:
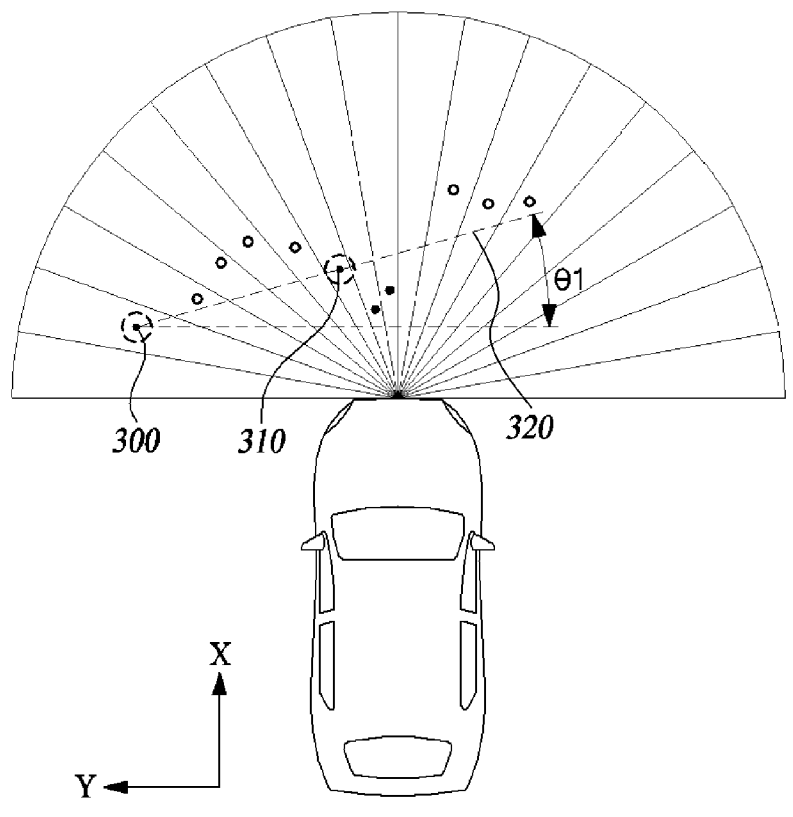
FIG. 3 shows an example of a process of generating a virtual slope angle and a virtual slope boundary within a cluster zone according to an example of the present disclosure.

FIG. 3 shows an example of a process of generating a virtual slope angle and a virtual slope boundary within a cluster zone according to an example of the present disclosure.

Referring to FIG. 3, the boundary unit 120 selects a point with the smallest x coordinate from a left to a traveling direction of the vehicle as a first point 300, from among all or parts of position coordinates within a cluster zone. The cluster zone is the zone which comprise clustered points, as shown in FIG. 2. If there is no point in the corresponding cell, that cell is ignored, and a point in a cell to the right thereof is selected. By using the first point 300 as a reference, a point with the smallest angle $\theta_1$ to a direction perpendicular to the traveling direction of the vehicle is selected as a second point 310 from among all or parts of position coordinates. This angle $\theta_1$ can be calculated by Equation 1:

$$\theta_1 = a\tan2(x_2 - x_1, y_2 - y_1) \qquad \text{[Equation 1]}$$

wherein $x_2$ and $y_2$ may be the x coordinate and y coordinate of the second point 310, respectively, and $x_1$ and $y_1$ may be the x coordinate and y coordinate of the first point 300, respectively. The calculated angle $\theta_1$ is referred to as a virtual slope boundary angle. According to an example of the present disclosure, the boundary unit 120 may generate the x coordinate of a virtual slope boundary in each cell by using the first point 300 and the virtual slope boundary angle $\theta_1$. In this case, the x coordinate of a virtual slope boundary in each cell can be calculated by Equation 2:

$$\text{Slope } x = \tan(\theta_1) \times (\text{cell } y - y_1) \qquad \text{[Equation 2]}$$

wherein Slope X is the x coordinate of a virtual slope boundary in a cell, cell y is the y coordinate of that cell, and $y_1$ is the y coordinate of the first point 300. By calculating the x coordinate of a virtual slope boundary in each cell and connecting all or parts of the x coordinates together, a virtual slope boundary 320 may be generated.

Figure 4:
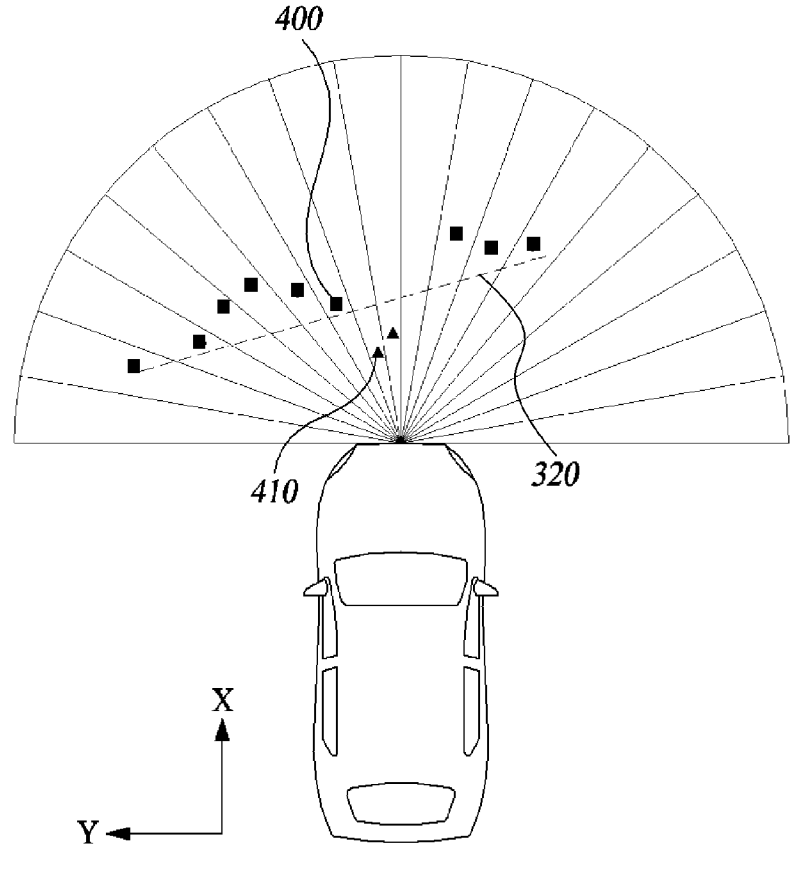
FIG. 4 shows an example of a process of identifying whether an object is behind the virtual slope boundary according to an example of the present disclosure.

FIG. 4 shows an example of a process of identifying whether an object is behind the virtual slope boundary according to an example of the present disclosure.

Referring to FIG. 4, a virtual slope boundary 320 is positioned for each cell. The post-processing unit 130 identifies whether an object in a cell is behind the virtual slope boundary by comparing the x coordinate of the virtual slope boundary in that cell and the x coordinate of the object in that cell. If the x coordinate of the virtual slope boundary is smaller than the x coordinate of the object 400, the object 400 is identified to be behind the virtual slope boundary. If the x coordinate of the virtual slope boundary is larger than the x coordinate of the object 410, the object 410 is identified to be in front of the virtual slope boundary.

Figure 5:
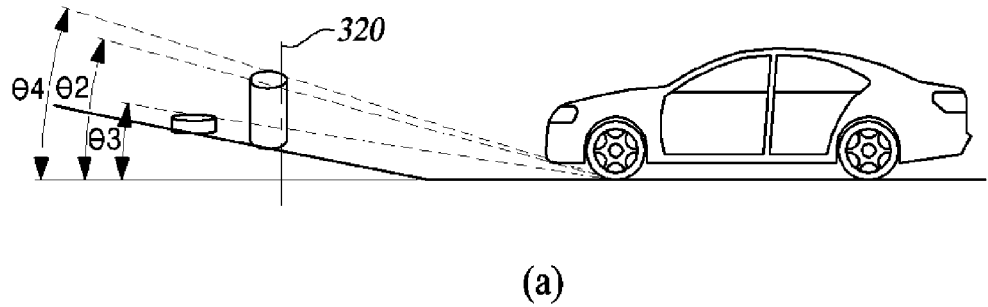
FIG. 5 shows an example of a process of deleting information on an object that involves no risk of collision and its coordinates according to an example of the present disclosure.
Figure 5:
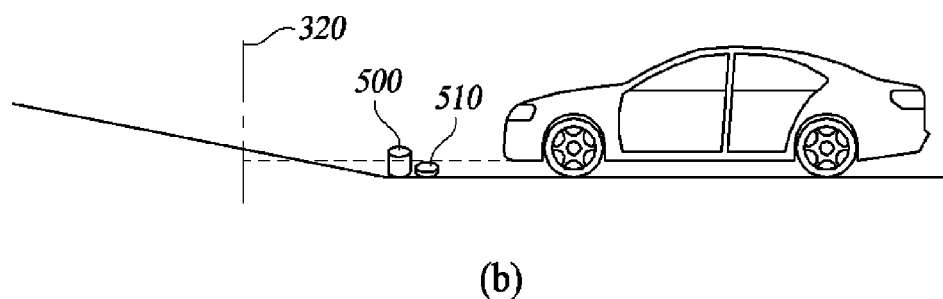

FIG. 5 shows an example of a process of deleting information on an object that involves no risk of collision and its coordinates according to an example of the present disclosure.

Referring to (a) of FIG. 5, for an object that is behind a virtual slope boundary, the post-processing unit 130 determines the likelihood of collision by comparing the bumper angle $\theta_2$ and the object angle $\theta_3$ on a cell-by-cell basis. The post-processing unit 130 may delete or maintain position coordinate information for the corresponding cell depending on the likelihood of collision. According to an example of the present disclosure, if the bumper angle $\theta_2$ is greater than the object angle $\theta_3$, there is no risk of collision between the object and the vehicle, and therefore, the entire information on the object may be deleted. If the bumper angle $\theta_2$ is smaller than or equal to the object angle $\theta_4$, there is a risk of collision with the object when the vehicle enters the slope, and therefore, the entire information on the object in that cell may be maintained. The bumper angle and the object angle may be calculated by Equation 3:

$$\theta_n = a\tan2(x_n, z_n) \qquad \text{[Equation 3]}$$

$x_n$ and $z_n$ are the x coordinate and z coordinate of the bumper or the object, respectively, and n is a natural number.

Referring to (b) of FIG. 5, for an object that is in front of a virtual slope boundary, the post-processing unit 130 determines the likelihood of collision by comparing the height of the object and the height of the vehicle on a cell-by-cell basis. If the height of the object 510 is smaller than the height of the vehicle, there is no risk of collision between the object and the vehicle, and therefore, the entire information on the object in that cell may be deleted. If the height of the object 500 is greater than or equal to the height of the vehicle, there is a risk of collision between the object and the vehicle, and therefore, the entire information on the object in that cell may be maintained.

Figure 6:
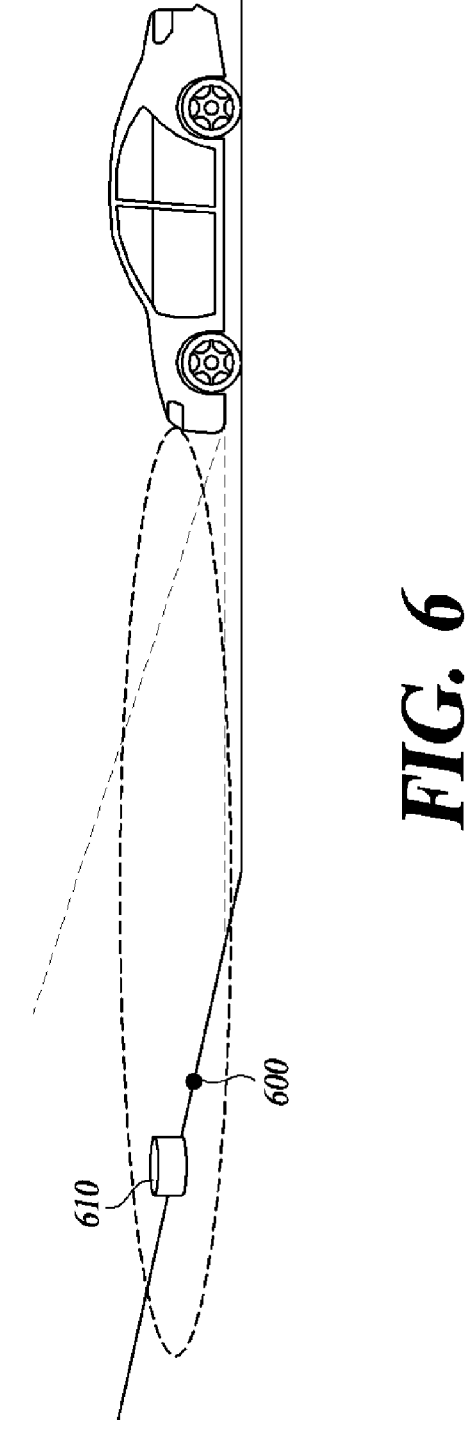
FIG. 6 shows an example of a situation in which a vehicle is approaching an upward slope according to an example of the present disclosure.

FIG. 6 shows an example of a situation in which a vehicle is approaching an upward slope according to an example of the present disclosure.

Referring to FIG. 6, the recognition unit 100 recognizes slope information as long as the vehicle has not yet entered the upward slope. A LiDAR sensor of the recognition unit 100 has slope information for each cell, and also has height information with respect to the slope or an object lying on the slope. If the angle of the slope is greater than the bumper angle, or there is an object lying on the slope, the likelihood of collision between the vehicle and the slope or the object lying on the slope may be determined. However, the accuracy of information on the slope for each cell may be low even if there is no object on the slope, and it is highly likely that the accuracy of information on the slope may be low if there is an object on the slope. Accordingly, the clustering unit 110 clusters the coordinates of an object in each cell that is lying on the slope. The boundary unit 120 generates a virtual slope boundary 320 by using the clustered coordinates, and then considers the objects 600 and 610 to be lying on the slope if the objects are located behind the virtual slope boundary. The post-processing unit 130 calculates the angle of the objects 600 and 610 lying on the slope and compares it with the bumper angle. If the bumper angle is greater than the angle of the object 600, the post-processing unit 130 determines that there is no risk of collision between the object 600 and the vehicle when driving on the slope, and deletes the entire information on the object 600. If the bumper angle is smaller than or equal to the angle of the object 610, the post-processing unit 130 determines that there is a risk of collision between the object 610 and the vehicle and maintains the entire information on the object 610 without deleting it. Through this process, the parking control apparatus may avoid braking error.

Figure 7:
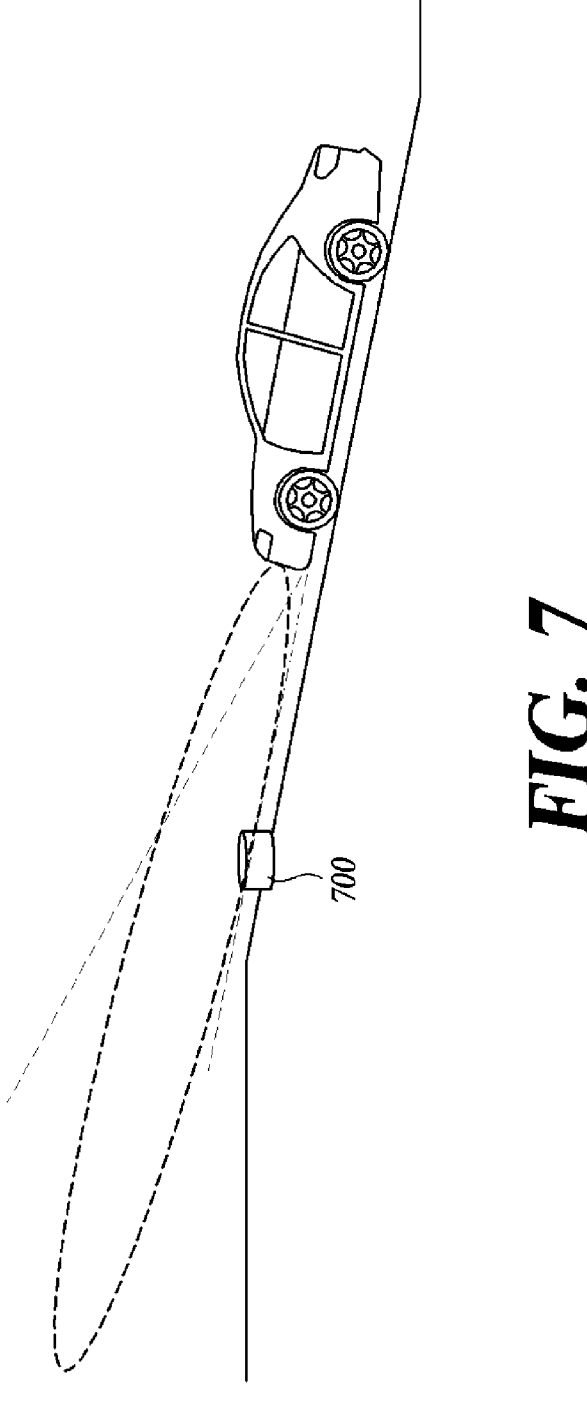
FIG. 7 shows an example of a situation in which the vehicle has just entered the upward slope according to an example of the present disclosure.

FIG. 7 shows an example of a situation in which the vehicle has just entered the upward slope according to an example of the present disclosure.

Referring to FIG. 7, the recognition unit 100 does not recognize slope information once the vehicle has entered the upward slope, and therefore no virtual slope boundary is generated even if there is an object lying on the slope. The post-processing unit 130 compares the height of the object 700 and the height of the vehicle like it does on a level road. Here, the term "level road" refers to a road on a level ground where there is no upward or downward slope. If the height of the vehicle is greater than the height of the object, the post-processing unit 130 determines that there is no risk of collision with the object and deletes the entire information on the object. If the height of the vehicle is lower than or equal to the height of the object, the post-processing unit 130 determines that there is a risk of collision with the object and maintains the entire information. Through this process, the parking control apparatus may avoid braking error.

Figure 8:
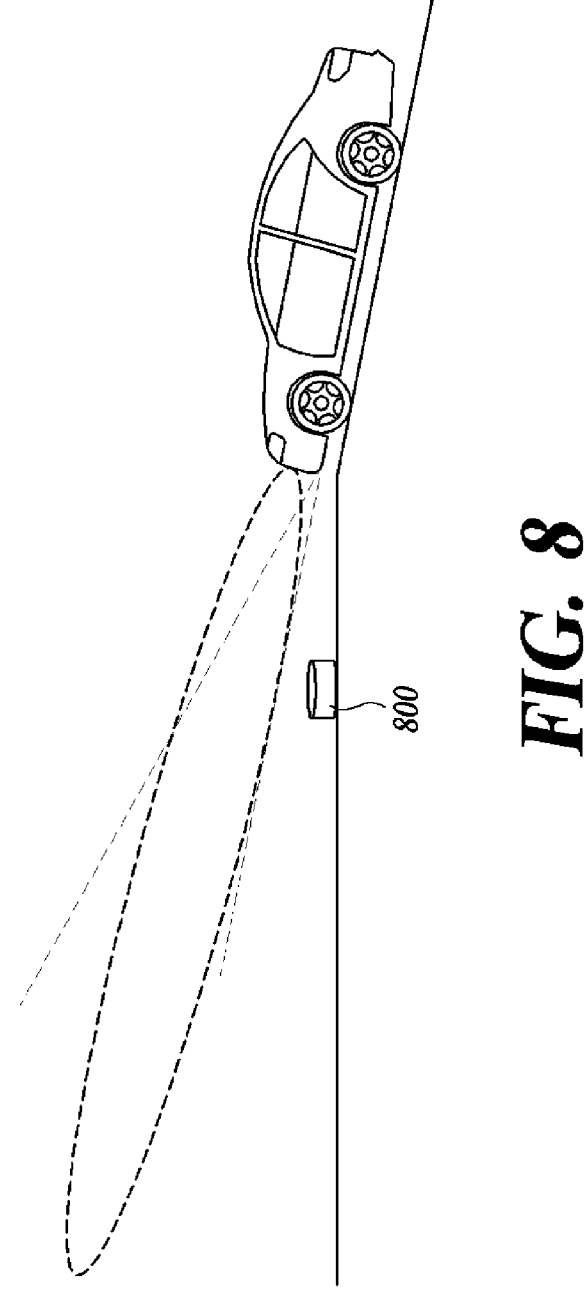
FIG. 8 shows an example of a situation in which the vehicle is about to leave the upward slope, according to an example of the present disclosure.

FIG. 8 shows an example of a situation in which the vehicle is about to leave the upward slope, according to an example of the present disclosure.

Referring to FIG. 8, the recognition unit 100 does not recognize slope information as long as the vehicle has not yet left the upward slope. Thus, there is no slope information even if there is an object on the level road past the slope, and the boundary unit 120 generates no virtual slope boundary and considers the vehicle to be on a level road. Since there is no information on the object 800, there is no need for the post-processing unit 130 to delete information on the object.

Figure 9:
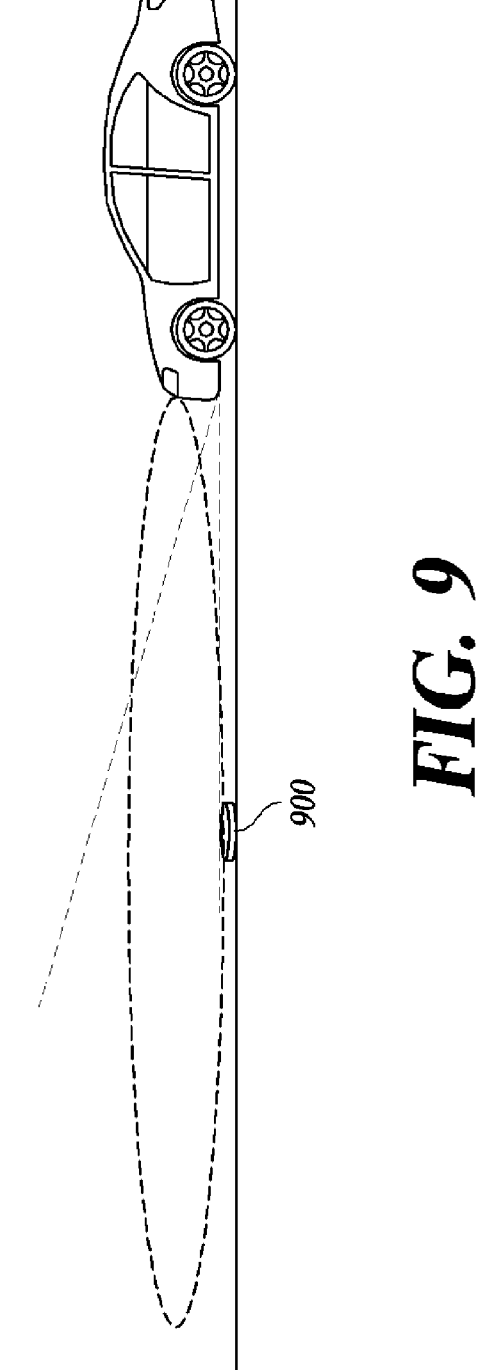
FIG. 9 shows an example of a level road situation according to an example of the present disclosure.

FIG. 9 shows an example of a level road situation according to an example of the present disclosure.

Referring to FIG. 9, since the recognition unit 100 does not recognize slope information in a level road situation, the boundary unit 120 generates no virtual slope boundary. If there is an object lying on the level road, the height of the object 900 and the height of the vehicle are compared. If the height of the vehicle is greater than the height of the object, the post-processing unit 130 determines that there is no risk of collision between the vehicle and the object and deletes the entire information on the object. If the height of the vehicle is smaller than or equal to the height of the object, the post-processing unit 130 determines that there is a likelihood of collision with the object and maintains the entire information on the object.

Figure 10:
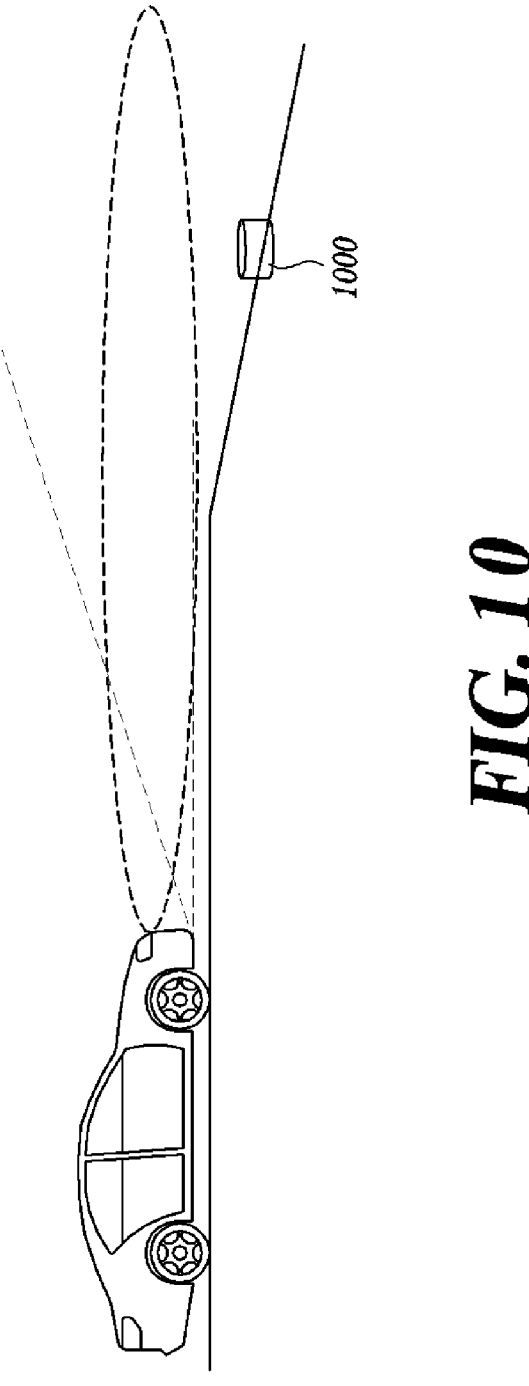
FIG. 10 shows an example of a situation in which the vehicle is approaching a downward slope according to an example of the present disclosure.

FIG. 10 shows an example of a situation in which the vehicle is approaching a downward slope according to an example of the present disclosure.

Referring to FIG. 10, the recognition unit 100 does not recognize slope information as long as the vehicle has not yet entered the downward slope. Thus, the boundary unit 120 generates no virtual slope boundary and considers the vehicle to be on a level road. Since there is no information on the object 1000 lying on the downward slope, there is no need for the post-processing unit 130 to delete information on the object.

Figure 11:
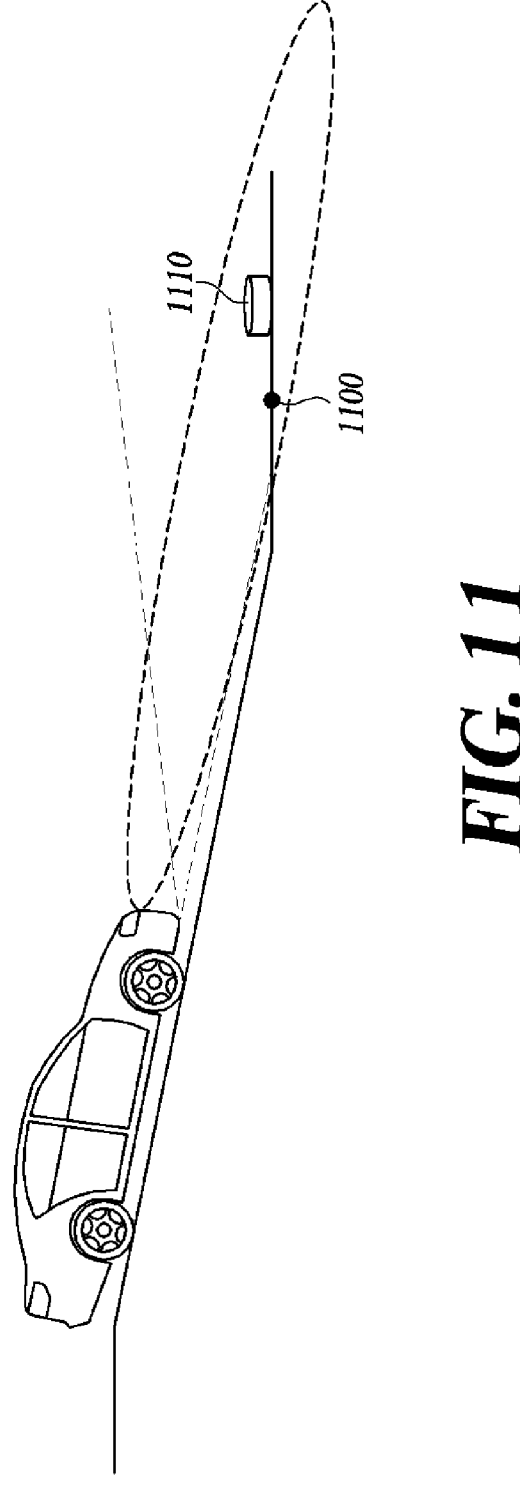
FIG. 11 shows an example of a situation in which the vehicle has just entered the downward slope according to an example of the present disclosure.

FIG. 11 shows an example of a situation in which the vehicle has just entered the downward slope according to an example of the present disclosure.

Referring to FIG. 11, the recognition unit 100 recognizes slope information once the vehicle has entered the downward slope. A LiDAR sensor of the recognition unit 100 has slope information for each cell, and also has height information with respect to the slope or an object lying on the slope. If the angle of the slope is greater than the bumper angle, or there is an object lying on the slope, the likelihood of collision between the vehicle and the slope or the object lying on the slope may be determined. However, the accuracy of information on the slope for each cell may be low even if there is no object on the slope, and it is highly likely that the accuracy of information on the slope may be low if there is an object on the slope. Accordingly, the clustering unit 110 clusters the coordinates of an object in each cell that is lying on the slope. The boundary unit 120 generates a virtual slope boundary 320 by using the clustered coordinates, and then considers the objects 1100 and 1110 to be lying on the slope if the objects 1100 and 1110 are located behind the virtual slope boundary. The post-processing unit 130 calculates the angle of the objects 1100 and 1110 lying on the slope and compares it with the bumper angle. If the bumper angle is greater than the angle of the object 1100, the post-processing unit 130 determines that there is no risk of collision between the object and the vehicle when driving on the slope, and deletes the entire information on the object. If the bumper angle is smaller than or equal to the angle of the object 1110, the post-processing unit 130 determines that there is a risk of collision between the object and the vehicle and maintains the entire information on the object without deleting it.

Figure 12:
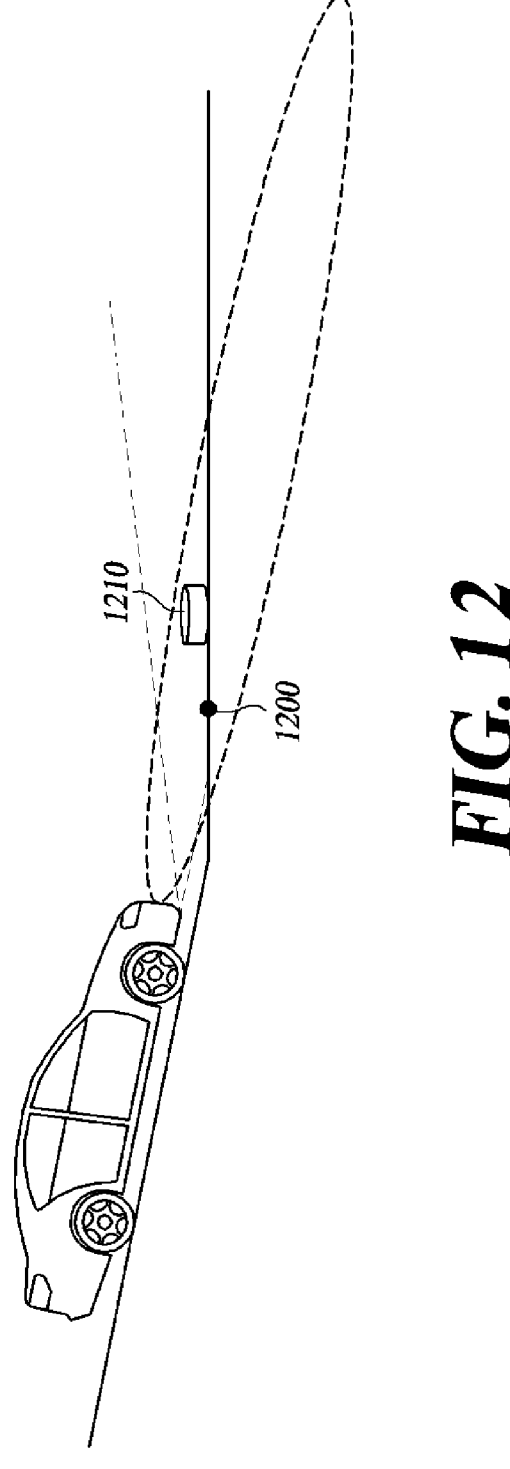
FIG. 12 shows an example of a situation in which the vehicle is about to leave the upward slope according to an example of the present disclosure.

FIG. 12 shows an example of a situation in which the vehicle is about to leave the upward slope according to an example of the present disclosure.

Referring to FIG. 12, the recognition unit 100 recognizes slope information as long as the vehicle has not yet left the downward slope. The recognition unit 100 recognizes slope information. A LiDAR sensor of the recognition unit 100 has slope information for each cell, and also has height information with respect to the slope or an object lying on the slope. If the angle of the slope is greater than the bumper angle, or there is an object lying on the slope, the likelihood of collision between the vehicle and the slope or the object lying on the slope may be determined. However, the accuracy of information on the slope for each cell may be low even if there is no object on the slope, and it is highly likely that the accuracy of information on the slope may be low if there is an object on the slope. Accordingly, the clustering unit 110 clusters the coordinates of an object in each cell that is lying on the slope. The boundary unit 120 generates a virtual slope boundary 320 by using the clustered coordinates, and then considers the object to be lying on the slope if the object is located behind the virtual slope boundary. The post-processing unit 130 calculates the angle of the object lying on the slope and compares it with the bumper angle. If the bumper angle is greater than the object angle 1200, the post-processing unit 130 determines that there is no risk of collision between the object and the vehicle when driving on the slope, and deletes the entire information on the object. If the bumper angle is smaller than or equal to the object angle 1210, the post-processing unit 130 determines that there is a risk of collision between the object and the vehicle and maintains the entire information on the object without deleting it. Through this process, the parking control apparatus may avoid breaking error.

Figure 13:
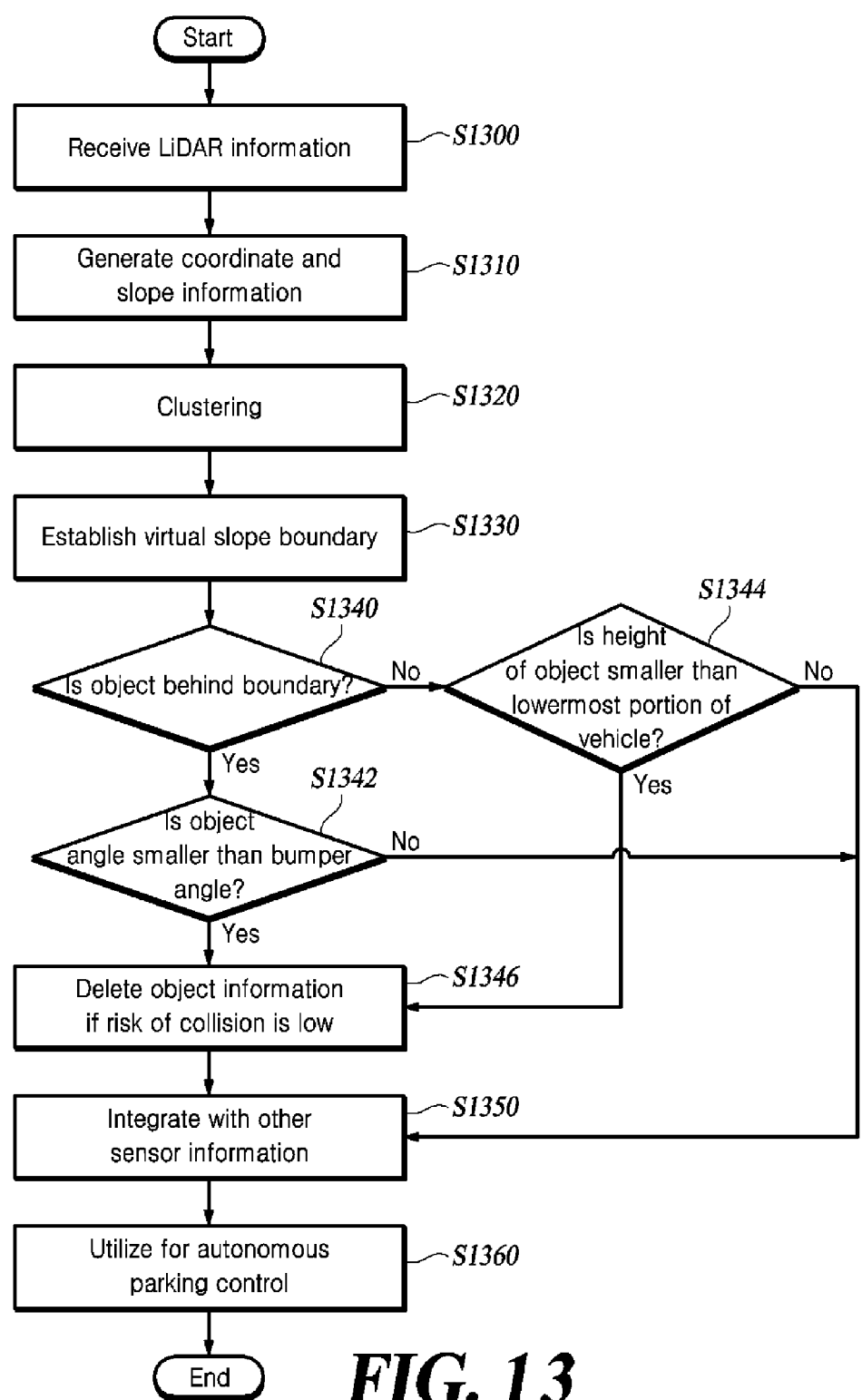
FIG. 13 shows an example of a parking control method according to an example of the present disclosure.

FIG. 13 shows an example of a parking control method according to an example of the present disclosure.

The recognition unit 100 receives a laser emitted by a LiDAR toward an object present ahead and recognizes information on the object (S1300). The recognition unit 100 generates information on a cell-by-cell basis, such as position coordinate information and slope information of the object ahead, based on the recognized object information (S1310). If no object exists in a certain cell, no position coordinate information and slope information are not generated for this cell. The process of recognizing object information and generating information may be repeated for every cell.

The clustering unit 110 clusters information based on the information generated by the recognition unit 100 (S1320). The clustering process may be repeated for every cell.

The boundary unit 120 establishes a virtual slope boundary by using position coordinate information for the zone clustered by the clustering unit 110 (S1330). According to an example of the present disclosure, the virtual slope boundary may be established through a virtual slope angle, a first point, and a second point.

The post-processing unit 130 determines the likelihood of collision between the vehicle and the object by utilizing the virtual slope boundary 320, and deletes the entire information on the object if there is no likelihood of collision. The virtual slope boundary 320 is positioned for each cell. The post-processing unit 130 identifies whether an object in a cell is behind the virtual slope boundary by comparing the x coordinate of a virtual slope boundary in that cell and the x coordinate of the object in that cell (S1340). According to an example of the present disclosure, for an object that is behind a virtual slope boundary, the post-processing unit 130 may determine the likelihood of collision by comparing the bumper angle and the object angle and delete or maintain the entire information on the object (S1342). According to another example of the present disclosure, for an object that is in front of a virtual slope boundary, the post-processing unit 130 may determine the likelihood of collision by comparing the height of the object in each cell and the height of the vehicle (S1344). If it is determined that there is no likelihood of collision, the post-processing unit 130 deletes the entire information on the object (S1346).

The sensor fusion unit 140 may integrate information received from the post-processing unit 130 with information post-processed by other sensors to generate coordinate information and environment information (S1350). The sensor fusion unit 140 may integrate post-processed camera recognition information and post-processed ultrasonic sensor recognition information with information post-processed by the post-processing unit 130 to generate coordinate information and environment information of the object ahead of the vehicle.

The autonomous parking control unit 150 performs autonomous parking control of the vehicle by utilizing coordinate information and environment information generated by the sensor fusion unit 140 (S1360). According to an example of the present disclosure, the autonomous parking control unit 150 may use the coordinate and environment information generated by the sensor fusion unit 140 in collision detection, braking control, and UX control, thereby avoiding braking error when performing parking control of the vehicle.

A primary example of an apparatus for controlling parking of a vehicle using a LiDAR sensor according to an example of the present disclosure is to post-process information recognized by using a LiDAR disposed on a vehicle and to reduce the risk of braking error by helping identify a slope and an object on the slope by using the post-processed information.

The examples of the present disclosure are not limited to the foregoing, and other examples not mentioned herein will be able to be clearly understood by those skilled in the art from the following description.

In an example of the present disclosure, a parking control apparatus is provided. The apparatus includes a recognition unit which receives information with respect to one or more objects on the ground from at least one LiDAR disposed on a vehicle and generates cell-by-cell position coordinate information and slope information with respect to the object; a clustering unit which clusters the cell-by-cell position coordinate information and the slope information to generate clustering information; a boundary unit which generates a virtual slope angle and a virtual slope boundary based on the clustering information; and a post-processing unit which identifies whether the object is behind the virtual slope boundary by using the virtual slope angle and the virtual slope boundary, compares a bumper angle, which is the angle between a lowermost portion of a front portion of the vehicle and the ground if the object is behind the virtual slope boundary, and deletes the cell-by-cell position coordinate information and slope information with respect to the object.

In another example of the present disclosure, a parking control method is provided. The method includes receiving information on one or more objects on the ground from at least one LiDAR disposed on a vehicle and generating cell-by-cell position coordinate information and slope information with respect to the object; clustering the cell-by-cell position coordinate information and the slope information to generate clustering information; generating a virtual slope angle and a virtual slope boundary based on the clustering information; and post-processing LiDAR recognition information by using the virtual slope angle and the virtual slope boundary, wherein the post-processing process comprises identifying whether the object is behind the virtual slope boundary by using the virtual slope angle and the virtual slope boundary, comparing a bumper angle, which is the angle between a lowermost portion of a front portion of the vehicle and the ground if the object is behind the virtual slope boundary, and deleting the cell-by-cell position coordinate information and slope information with respect to the object.

According to an example of the present disclosure, it is possible to prevent a braking error which may be caused when a parking control apparatus makes a misidentification in a situation where a vehicle moves forward down a slope where a low obstacle is present. The effects of the present disclosure are not limited to the foregoing, and other effects not mentioned herein will be able to be clearly understood by those skilled in the art from the following description.

Each element of the apparatus or method according to the present disclosure may be implemented in hardware, software, or a combination of hardware and software. Further, the function of each element may be implemented in software, and the microprocessor may be implemented to execute the function of software corresponding to each element.

Various implementations of the systems and techniques described herein can be realized by digital electronic circuitry, integrated circuitry, FPGAs (field programmable gate arrays), ASICs (application specific integrated circuits), computer hardware, firmware, software, and/or combinations thereof. These various implementations can include implementation in one or more computer programs that are executable on a programmable system. The programmable system includes at least one programmable processor (which may be a special-purpose processor or a general-purpose processor) coupled to receive data and instructions from, and transmit data and instructions to, a storage system, at least one input device, and at least one output device. Computer programs (also known as programs, software, software applications or code) contain instructions for a programmable processor and are stored on a "computer-readable recording medium".

The computer-readable recording medium includes all or some types of recording devices in which data readable by a computer system is stored. These computer-readable recording media may include non-volatile or non-transitory media, such as ROM, CD-ROM, magnetic tape, floppy disk, memory card, hard disk, magneto-optical disk, and storage device, and may further include transitory media such as data transmission media. In addition, the computer-readable recording medium may be distributed in network-connected computer systems, and computer-readable codes may be stored and executed in a distributed manner.

Although the flowcharts/timing diagrams of the present specification are shown to sequentially implement each process, this is merely illustrative of the technical idea of one example of the present disclosure. In other words, a person having ordinary skill in the art may make various modifications and alterations by changing the sequences described in the flowcharts/timing diagrams or executing one or more of the processes in parallel, without departing from the essential characteristics of one example of the present disclosure, and therefore the flowcharts/timing diagrams are not limited to a chronological order.

Although exemplary examples of the present disclosure have been described for illustrative purposes, those skilled in the art will appreciate that various modifications, additions, and substitutions are possible, without departing from the idea and scope of the claimed features. Therefore, exemplary examples of the present disclosure have been described for the sake of brevity and clarity. The scope of the technical idea of the examples of the present disclosure is not limited by the illustrations. Accordingly, one of ordinary skill would understand the scope of the claimed features is not to be limited by the above explicitly described examples but by the claims and equivalents thereof.

What is claimed is:

1. An apparatus comprising:
a processor; and
memory storing instructions, when executed by the processor, cause the apparatus to:
receive, from at least one sensor disposed on a vehicle, information associated with a plurality of objects on a ground, wherein the plurality of objects are located in different cells;
generate, based on the information, cell-by-cell position information and slope information for each of the plurality of objects, wherein a piece of the cell-by-cell position information indicates coordinates of an object in a cell of the different cells, and a piece of the slope information indicates whether the object in the cell is placed on a slope;

15 generate, based on performing a clustering process on each piece of the cell-by-cell position information and slope information, clustering information;

generate, based on the clustering information, slope angle information and boundary information, wherein the boundary information indicates a boundary associated with the different cells, and the slope angle information indicates an angle between the boundary and a direction perpendicular to a traveling direction of the vehicle;

determine, based on the slope angle information and the boundary information, whether one of the plurality of objects is behind the boundary;

based on a determination that the one of the plurality of objects is behind the boundary, compare a bumper angle of the vehicle and an object angle of the one of the plurality of objects, wherein the bumper angle is an angle between a lowermost portion of a front portion of the vehicle and the ground, and the object angle is an angle between the one of the plurality of objects and the ground;

determine, based on the comparison, whether the vehicle is likely to collide with the one of the plurality of objects; and based on a determination that the vehicle is not likely to collide with the one of the plurality of objects, delete a piece of the cell-by-cell position information and slope information associated with the one of the plurality of objects.

2. The apparatus of claim 1, wherein the instructions, when executed by the processor, cause the apparatus to:

determine whether a cell, of the different cells, includes the object;

based on a determination that the cell includes the object:

generate x, y, and z coordinate information of the object in the cell; and generate the slope information based on whether the object is identified to be lying on a slope.

3. The apparatus of claim 1, wherein the cell includes a region in front of the vehicle that is divided in angular units;

wherein the instructions, when executed by the processor, cause the apparatus to:

select position coordinates of an object in the leftmost cell, among all objects placed on the slope, as reference coordinates, to perform the clustering process on the position coordinates of the object in the cell to generate clustered position coordinates, based on:

determining that an object in a cell located on a right side of the leftmost cell where the reference coordinates are located is on the slope, or determining that the object in the cell is not placed on the slope and position coordinates of the object in the cell are located within a threshold distance from the reference coordinates; and wherein the instructions, when executed by the processor, cause the apparatus to:

select a coordinate having a leftmost x-coordinate among the clustered position coordinates, as a first coordinate, to select a coordinate that forms a smallest angle with a direction perpendicular to a traveling direction of the vehicle with reference to the first coordinate among the clustered position coordinates, as a second coordinate; and determine boundary information indicating a boundary line by connecting the first coordinate and the second coordinate.

4. The apparatus of claim 1, wherein the instructions, when executed by the processor, cause the apparatus to:

select position coordinates of an object in the leftmost cell, among all objects placed on the slope, as reference coordinates;

determine that an object in a cell located on a right side of the leftmost cell where the reference coordinates are located is not on the slope and that position coordinates of the object in the cell are located outside a threshold distance from the reference coordinates, or that there is no object in the cell located to a right side of the leftmost cell where the reference coordinates are located;

based on the determination, perform a process of generating temporary reference coordinates of the object in the cell and perform the clustering process on the temporary reference coordinates to generate clustered temporary reference coordinates;

change the reference coordinates to the clustered temporary reference coordinates; and repeat, based on the change, the selection, the determination, the process of generating temporary reference coordinates, and the clustering process.

5. The apparatus of claim 1, wherein the instructions, when executed by the processor, cause the apparatus to:

select a first point from a cell located on a left side of the traveling direction of the vehicle, the first point having the smallest x coordinate among all position coordinates in cells within a cluster zone;

select a second point from the cells such that an angle, between a line perpendicular to the travelling direction of the vehicle and a line connecting the first point and the second point, is the smallest;

generate an angle based on the first and second points;

generate, for each of the cells, an x coordinate of a boundary point in a cell based on the first point, the angle, and y coordinate information for the cell; and generate the boundary by connecting the x coordinates generated for each of the cells.

6. The apparatus of claim 1, wherein the instructions, when executed by the processor, cause the apparatus to:

compare an x coordinate of a boundary point in a cell and an x coordinate of an object in the cell;

determine that the x coordinate of the boundary point is smaller than the x coordinate of the object; and based on the determination that the x coordinate of the boundary point is smaller than the x coordinate of the object, determine that the object is behind the boundary.

7. The apparatus of claim 1, wherein the instructions, when executed by the processor, cause the apparatus to:

compare a height of an object in front of the boundary and a height of the vehicle, wherein the height of the vehicle is a distance between a lowermost portion of the vehicle and the ground;

determine that the height of the object is smaller than the height of the vehicle; and based on the determination that the height of the object is smaller than the height of the vehicle, delete a piece of the cell-by-cell position information and the slope information associated the object.

8. The apparatus of claim 1, wherein the instructions, when executed by the processor, cause the apparatus to:

generate coordinate and environment information; and control autonomous parking of the vehicle based on the generated coordinate and environment information.

9. The apparatus of claim 8, wherein the instructions, when executed by the processor, cause the apparatus to perform at least one of collision detection, braking control, or user experience control.

10. The apparatus of claim 1, wherein the instructions, when executed by the processor, cause the apparatus to determine slope angle information indicating a slope angle, using the boundary information and a line formed in a direction perpendicular to the traveling direction of the vehicle.

11. A method comprising:
receiving, from at least one sensor disposed on a vehicle, information associated with a plurality of objects on a ground, wherein the plurality of objects are located in different cells;
generating, based on the information, cell-by-cell position information and slope information for each of the plurality of objects, wherein a piece of the cell-by-cell position information indicates coordinates of an object in a cell of the different cells, and a piece of the slope information indicates whether the object in the cell is placed on a slope;
generating, based on performing a clustering process on each piece of the cell-by-cell position information and the slope information, clustering information;
generating, based on the clustering information, slope angle information and boundary information, wherein the boundary information indicates a boundary associated with the different cells, and the slope angle information indicates an angle between the boundary and a direction perpendicular to a traveling direction of the vehicle; and
post-processing sensor recognition information based on the slope angle information and the boundary information,
wherein the post-processing the sensor recognition information comprises:
determining whether one of the plurality of objects is behind the boundary based on the slope angle information and the boundary information;
based on a determination that the one of the plurality of objects is behind the boundary, comparing a bumper angle of the vehicle and an object angle of the one of the plurality of objects, wherein the bumper angle is an angle between a lowermost portion of a front portion of the vehicle and the object angle is an angle between the one of the plurality of objects and the ground;
determining, based on the comparing, whether the vehicle is likely to collide with the one of the plurality of objects; and
based on a determination that the vehicle is not likely to collide with the one of the plurality of objects, deleting a piece of the cell-by-cell position information and slope information associated with the one of the plurality of objects.

12. The method of claim 11, wherein the performing the clustering process comprises:
determining whether a cell, of the different cells, includes the object;
based on a determination that the cell includes the object:
generating x, y, and z coordinate information of the object in the cell; and
generating the slope information based on whether the object is identified to be placed on a slope.

13. The method of claim 11, wherein the cell includes a region in front of the vehicle that is divided in angular units;

wherein the generating the clustering information comprises:
selecting position coordinates of an object in the leftmost cell, among all objects placed on the slope, as reference coordinates; and
performing the clustering process on the position coordinates of the object in the cell to generate clustered position coordinates, based on: determining that an object in a cell located on a right side of the leftmost cell where the reference coordinates are located is on the slope, or determining that the object in the cell is not placed on the slope and position coordinates of the object in the cell are located within a threshold distance from the reference coordinates; and
wherein the generating, based on the clustering information, the slope angle information and the boundary information comprises:
selecting a coordinate having a leftmost x-coordinate among the clustered position coordinates, as a first coordinate;
selecting a coordinate that forms a smallest angle with a direction perpendicular to a traveling direction of the vehicle with reference to the first coordinate among the clustered position coordinates, as a second coordinate; and
determining boundary information indicating a boundary line by connecting the first coordinate and the second coordinate.

14. The method of claim 11, wherein the generating the clustering information comprises:
selecting position coordinates of an object in the leftmost cell, among all objects placed on the slope, as reference coordinates;
determining that an object in a cell located on a right side of the leftmost cell where the reference coordinates are located is not on the slope and that position coordinates of the object in the cell are located outside a threshold distance from the reference coordinates, or that there is no object in the cell located on a right side of the leftmost cell where the reference coordinates are located;
based on the determining, performing a process of generating temporary reference coordinates of the object in the cell and performing the clustering process on the temporary reference coordinates to generate clustered temporary reference coordinates;
changing the reference coordinates to the clustered temporary reference coordinates; and
repeating, based on the changing, the selecting and the determining, the process of generating temporary reference coordinates, and the clustering process.

15. The method of claim 11, wherein the generating the slope angle information and the boundary information comprises:
selecting a first point from a cell located on a left side of the traveling direction of the vehicle, the first point having the smallest x coordinate among all position coordinates in cells within a cluster zone;
selecting a second point from the cells such that an angle, between a line perpendicular to the travelling direction of the vehicle and a line connecting the first point and the second point, is the smallest;
generating an angle based on the first and second points;
generating, for each of the cells, an x coordinate of a boundary point in a cell based on the first point, the angle, and y coordinate information for the cell; and generating the boundary by connecting the x coordinates generated for each of the cells.

16. The method of claim 11, wherein the post-processing comprises:

comparing an x coordinate of a boundary point in a cell and an x coordinate of an object in the cell;

determining that the x coordinate of the boundary point is smaller than the x coordinate of the object; and based on the determining that the x coordinate of the boundary point is smaller than the x coordinate of the object, determining that the object is behind the boundary.

17. The method of claim 11, wherein the post-processing comprises:

comparing a height of an object in front of the boundary and a height of the vehicle, wherein the height of the vehicle is a distance between a lowermost portion of the vehicle and the ground;

determining that the height of the object is smaller than the height of the vehicle; and based on the determination that the height of the object is smaller than the height of the vehicle, deleting a piece of the cell-by-cell position information and the slope information associated the object.

18. The method of claim 11, further comprising:

generating coordinate and environment information based on information post-processed by the post-processing; and controlling autonomous parking of the vehicle based on the generated coordinate and environment information.

19. The method of claim 18, wherein the controlling of autonomous parking comprises performing at least one of collision detection, braking control, or user experience control.

20. The method of claim 11, wherein the slope angle information indicates a slope angle, using the boundary information and a line formed in a direction perpendicular to the traveling direction of the vehicle.

* * * * *